May 3, 1955 S. H. FILLION ET AL 2,707,610
DAMPED RESILIENT HOOK DEVICE
Filed Feb. 12, 1954
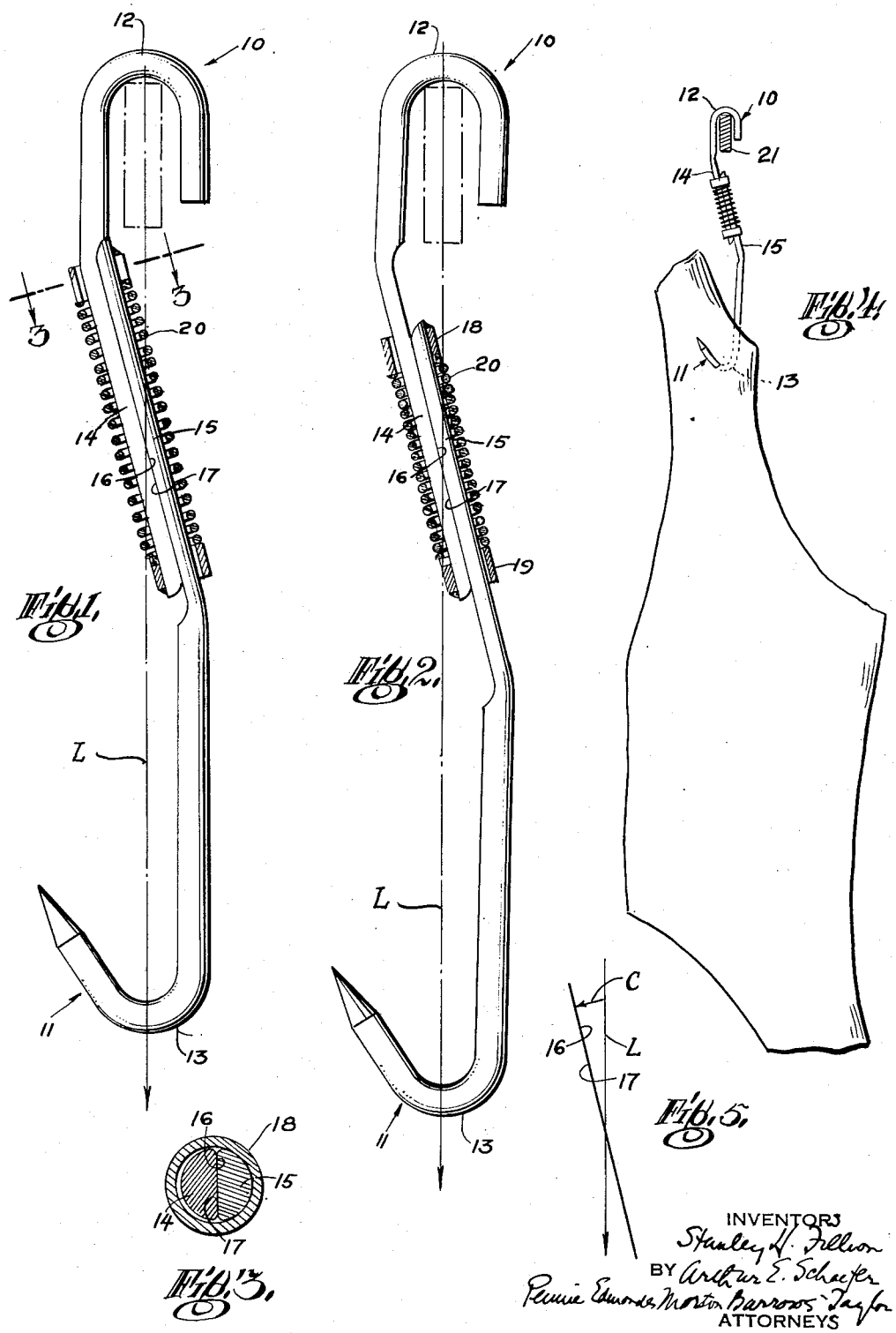
INVENTORS
Stanley H. Fillion
BY Arthur E. Schaefer
Pennie Edmonds Morton Barrows Taylor
ATTORNEYS

United States Patent Office 2,707,610
Patented May 3, 1955

2,707,610

DAMPED RESILIENT HOOK DEVICE

Stanley H. Fillion, Scarsdale, and Arthur E. Schaefer, New Hyde Park, N. Y., assignors to Waugh Equipment Company, New York, N. Y., a corporation of Maine Application February 12, 1954, Serial No. 410,014

4 Claims. (Cl. 248—215)

This invention relates to hooks for suspending articles and is concerned more particularly with a novel hook device for resiliently supporting a load, which includes friction means for damping the cushioning action. The new device may be used to especial advantage for supporting meat during shipment and a form of the device suitable for that purpose will be illustrated and described in detail for purposes of explanation.

In the transportation of meat in railway refrigerator cars, rigid hooks have been used heretofore to suspend sides of beef, for example, from racks, with each hook passing through the space behind the tendon in the lower portion of the hind leg of the side. From time to time, meat so suspended is subjected to shocks of such severity that the hook is torn loose with the result that the meat drops to the floor of the car and is so damaged that its salability is reduced. To prevent such injury to meat in shipment, hooks have been devised, which comprise two hook members held against relative lengthwise movement by a spring, so that such a hook supports its load resiliently. However, these hooks have been found unsatisfactory because, under certain conditions, the vibration of the suspended meat develops a harmonic condition and gradually increases in amplitude to a point where the sides of beef are torn loose from the hooks.

The new hook device differs from the prior hooks, in that it supports its load resiliently but is provided with friction means to damp the cushioning action of the mounting and thus restrict vibration of the suspended load.

In one form, the hook device of the invention includes a pair of members each having a hook and a shank with a friction surface facing generally toward its hook end. The shanks are connected by a resilient means so that the friction surfaces bear against each other, and the latter are disposed at an angle to and are intersected by a line through the points of application of a load to the hooks. When a load is applied to the device, the members move lengthwise with the friction surfaces sliding on each other and, at the same time, a component of the applied force urges the surfaces toward each other, thereby increasing the frictional effect. As a result, part of the applied force is absorbed and converted into frictional heat and vibration of the load is restricted.

For a better understanding of the invention, reference may be had to the accompanying drawing, in which:

Fig. 1 is a side elevational view of a typical hook device constructed in accordance with the invention;

Fig. 2 is a side elevational view of the hook device in an extended position;

Fig. 3 is a cross-sectional view taken on line 3—3 of Fig. 1;

Fig. 4 is a side elevational view of the device supporting a side of beef;

Fig. 5 is a force diagram illustrating the action of the hook device.

The hook device shown in the drawing includes a pair of members 10, 11, each having a hook 12, 13 and a shank 14, 15, respectively. Each shank has a lengthwise friction surface 16, 17 formed lengthwise thereof, which faces generally towards the hook end of its member, and the shanks overlap and extend in opposite directions with the surfaces bearing against each other. The shanks carry respective collars 18, 19 fast thereto at the outer ends of the shanks and the collar on each shank loosely encircles the other shank. A coil spring 20 loosely encircles the shanks and bears at its ends against the collars. The shanks lie at an angle to a line A drawn between the points of application of a load to the hooks and the line intersects the friction surfaces substantially at their midpoint.

When the hook device is in use in the shipment of meat, the hook member 10 may be suspended from a bar 21, which may be attached rigidly to part of the refrigerator car body. The meat, which may be a side of beef, a pig carcass, etc., indicated at 22, is then hung from hook member 11. When the load is applied to the device, the members move apart to elongate the device, thereby compressing spring 20. As the friction surfaces are moved along each other, a component C (Fig. 5) of the applied load L acts to force the surfaces against each other, increasing the frictional effect. Part of the applied load is thus absorbed and converted into frictional heat, which is dissipated, so that vibration is damped and prevented from attaining an excessive amplitude.

We claim:

1. A hook device comprising a pair of members, each having a hook and a shank, and resilient means for connecting the members with their shanks overlapping and extending in opposite directions, the shanks lying at an angle to a line through the points of application of a load to the hooks and having engaging friction surfaces intersected by said line, and each surface facing toward the hook end of its member, whereby said friction surfaces dampen vibrations in the hook device.

2. A hook device comprising a pair of members, each having a hook and a shank with a friction surface extending lengthwise of the shank and facing generally towards the hook end of its member, and resilient means for connecting the members with their shanks overlapping and extending in opposite directions and with the friction surfaces bearing against each other, the surfaces lying at an angle to and intersected by a line through the points of application of a load to the hooks, whereby said friction surfaces dampen vibrations in the hook device.

3. A hook device comprising a pair of members, each having a hook and a shank with a friction surface facing generally towards the hook end of its member, and resilient means for connecting the members with their shanks overlapping and extending in opposite directions and with the friction surfaces bearing against each other, the shanks lying at an angle to a line through the points of application of a load to the hooks with the friction surfaces intersected near their mid-points by said line, whereby said friction surfaces dampen vibrations in the hook device.

4. A hook device comprising a pair of members, each having a hook and a shank with a friction surface extending lengthwise of the shank and facing generally towards the hook end of its member, the shanks of the members overlapping and extending in opposite directions with the friction surfaces in contact, a collar connected to each shank near its outer end and loosely encircling the other shank, and a coil spring encircling about the shanks between the collars and urging the collars apart, the shanks lying at an angle to a line through the points of application of a load to the hooks with the friction surfaces intersected by said line between their ends, whereby said friction surfaces dampen vibrations in the hook device.

References Cited in the file of this patent

UNITED STATES PATENTS

| | | | |
|---|---|---|---|
| 974,200 | Stark | Nov. 1, | 1910 |
| 1,726,244 | Shefstead | Aug. 27, | 1929 |
| 1,788,722 | Koebler | Jan. 13, | 1931 |
| 1,994,322 | O'Neil | Mar. 12, | 1935 |

FOREIGN PATENTS

| | | | |
|---|---|---|---|
| 11,138 | Australia | Jan. 31, | 1934 |